United States Patent
Kudo et al.

(10) Patent No.: US 7,543,150 B2
(45) Date of Patent: Jun. 2, 2009

(54) METHOD AND SYSTEM FOR SETTING UP HOSTING ENVIRONMENTS IN SAFETY

(75) Inventors: Yutaka Kudo, Yokohama (JP); Futoshi Haga, Sagamihara (JP); Takeshi Ishizaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 11/044,956

(22) Filed: Jan. 26, 2005

(65) Prior Publication Data

US 2006/0026429 A1   Feb. 2, 2006

(30) Foreign Application Priority Data

Jul. 27, 2004   (JP) .............................. 2004-218044

(51) Int. Cl.
H04L 9/00   (2006.01)
(52) U.S. Cl. ........................................ 713/176; 726/17
(58) Field of Classification Search ................. 713/170, 713/176, 173, 168, 166, 1, 2; 709/228, 220; 463/43; 726/17
See application file for complete search history.

(56) References Cited

U.S. PATENT DOCUMENTS

| | | | | |
|---|---|---|---|---|
| 6,253,322 | B1* | 6/2001 | Susaki et al. ................. | 713/170 |
| 6,463,535 | B1* | 10/2002 | Drews ......................... | 713/176 |
| 6,694,360 | B1* | 2/2004 | Duguay et al. .............. | 709/220 |
| 6,810,122 | B1 | 10/2004 | Miyazaki et al. | |
| 6,902,484 | B2* | 6/2005 | Idaka ........................... | 463/43 |
| 7,191,327 | B2* | 3/2007 | Viljoen et al. ................. | 713/2 |
| 7,222,229 | B1* | 5/2007 | Miyamoto et al. ............ | 713/1 |
| 2003/0204603 | A1* | 10/2003 | Buchanan et al. ........... | 709/228 |
| 2003/0236984 | A2* | 12/2003 | Mullen et al. ................ | 713/173 |
| 2004/0003103 | A1* | 1/2004 | Witt et al. .................... | 709/231 |
| 2005/0246529 | A1* | 11/2005 | Hunt et al. ................... | 713/168 |
| 2005/0246770 | A1* | 11/2005 | Hunt et al. ................... | 726/17 |
| 2005/0283606 | A1* | 12/2005 | Williams ..................... | 713/166 |
| 2007/0118749 | A1* | 5/2007 | Hagn et al. .................. | 713/173 |

FOREIGN PATENT DOCUMENTS

| JP | 2003-122588 | 10/2001 |
|---|---|---|
| JP | 2003-216593 | 1/2002 |

OTHER PUBLICATIONS

Sun microsystems; Secure WAN boot- Toward a Lights-Out Environment; Feb. 2004; Sun Microsystems White paper; pp. 1-16.*

* cited by examiner

*Primary Examiner*—Kambiz Zand
*Assistant Examiner*—Monjour Rahim
(74) *Attorney, Agent, or Firm*—Townsend and Townsend and Crew LLP (57) ABSTRACT

In a data center architecture or the like, the present invention provides a method for setting up hosting environments concurrently by loading a boot image by means of network boot or the like, allowing for fast booting even with a large boot image, while preserving security. A boot image is divided into a plurality of parts. Computer resources have their public keys stored in their BIOS ROMs and e-signatures are attached to the boot image parts with a private key corresponding to one of the public keys. Also, priority levels in e-signature verification are assigned to the boot image parts. A boot instruction includes priority level setting. Only for boot image parts with that priority level or higher, e-signature verification is performed. By this manner, booting can be performed faster than booting involving verification of the e-signature to a whole boot image.

20 Claims, 10 Drawing Sheets

Key Management Table 110

| | Public Key ID | Private Key ID | Private Key |
|---|---|---|---|
| | 201 | 202 | 203 |
| 211 | PKey ID_001 | SKey ID_001 | SKey001 |
| 212 | PKey ID_002 | SKey ID_002 | SKey002 |
| 213 | PKey ID_003 | SKey ID_003 | SKey003 |
| | ... | ... | ... |

FIG.3

Key Configuration Table 111

| | Computer Resource ID | Public Key ID |
|---|---|---|
| | 301 | 302 |
| 311 | RES_001 | PKey ID_001 |
| 312 | RES_002 | PKey ID_001 |
| 313 | RES_003 | PKey ID_001 |
| 314 | RES_004 | PKey ID_002 |
| 315 | RES_005 | PKey ID_002 |
| | ... | ... |

FIG.4

Boot Image Management Table 112

| | Boot Image ID | Boot Image Location | Private Key ID | E-Signature Location | Priority Information Location |
|---|---|---|---|---|---|
| | 401 | 402 | 403 | 404 | 405 |
| 411 | BOOT_001 | /BOOT_001/boot | SKey ID_001 | /BOOT_001/signature | /BOOT_001/priority |
| 412 | BOOT_002 | /BOOT_002/boot | SKey ID_001 | /BOOT_002/signature | /BOOT_002/priority |
| 413 | BOOT_003 | /BOOT_003/boot | SKey ID_001 | /BOOT_003/signature | /BOOT_003/priority |
| 414 | BOOT_004 | /BOOT_004/boot | SKey ID_001 | /BOOT_004/signature | /BOOT_004/priority |
| 415 | BOOT_005 | /BOOT_005/boot | SKey ID_002 | /BOOT_005/signature | /BOOT_005/priority |
| | ... | ... | ... | ... | ... |

Boot Instruction Table 113
(created as the result of step 702)

| Computer Resource ID (301) | Boot Image ID (401) | Priority Setting (801) | Boot Successful or Not (802) |
|---|---|---|---|
| RES_001 | BOOT_001 | ≦3 | YES |
| RES_002 | BOOT_001 | ≦3 | YES |
| RES_003 | BOOT_001 | ≦3 | |
| RES_004 | BOOT_001 | ≦3 | YES |
| RES_005 | BOOT_001 | ≦3 | |

METHOD AND SYSTEM FOR SETTING UP HOSTING ENVIRONMENTS IN SAFETY

CROSS-REFERENCES TO RELATED APPLICATIONS

The present application is related to and claims priority from Japanese Patent Application No. 2004-218044, filed Jul. 27, 2004, and is hereby incorporated by reference for all purposes.

BACKGROUND OF THE INVENTION

The present invention appertains to a provisioning technique to set up hosting environments for a business application system through a data center, intra-corporate computing center, and the like.

Recently, there is a move to have centralized configuration of a business application system in the architecture of a data center, intra-corporate computing center, and the like in order to make effective use of computer resources. So far, most of business application systems have been built by fixed allocation of compute resources. Instead, the above configuration builds a bushiness application system by allocating a required quantity of computer resources for a period during which the system is needed, aiming to efficiently run a plurality of business application systems using reduced computer resources. To realize the above configuration, a technique for building a business application system on a computer resource at low cost is required. For example, as disclosed in JP-A No. 216593/2003 (patent document 1), a method for installing various, many servers (a business application system and its hosting environments) together at a time has been contrived. According to patent document 1, a plurality of computer resources provided with network boot means acquire a set of programs and setting data (hereinafter referred to as a boot image) from a central management server and a storage server when they boot. Then, discrete setup operations for the plurality of computer resources can be performed concurrently.

However, in the above prior art, if a malicious attacker sends false boot images to the computer resources, incorrect business application system and hosting environments would be built. The prior art involves a problem with security, that is, there is no means for protecting the data center and intra-corporate computing center. For example, if a hacking program is embedded in a boot image, there may be serious and fatal consequences for the business. A method for solving this problem has been developed, for example, as disclosed in JP-A No. 122588/2003 (patent document 2). In this method, an electronic signature (e-signature) is attached to a boot image (software in the description of patent document 2) and the e-signature is verified during a booting process (start-up in the description of patent document 2); thereby this method can prevent a false boot image from running to start the system.

However, a problem with the method disclosed in JP-A No. 122588/2003 (patent document 2) is that it takes long to verify the e-signature of a boot image of great size. Time taken to verify the e-signature attached to a file of relatively small size such as the file of a software patch, device driver, or the like is regarded as negligible. In the situation where various, many servers (a business application system and its hosting environments) are installed together at a time, quite a large boot image including an OS and middleware may be used and time taken to verify its e-signature is not negligible.

The e-signature technique used in the above situation only allows for an either-or choice of whether or not to perform e-signature verification. The prior-art method cannot meet a need to shorten the boot time while not to skip e-signature verification, which is another drawback thereof.

BRIEF SUMMARY OF THE INVENTION

An object of the present invention is to provide a method for setting up hosting environments safely and quickly in building a business application system and its hosting environments by loading boot images to computer resources, using a network boot technique or the like.

The present invention takes advantage of a technique of e-signature and its verification using asymmetric keys (e.g., public and private keys). First, the public keys of computer resources are stored in the BIOS ROMs of the computer resources. Using private keys corresponding to the public keys, e-signatures are attached to boot images. Immediately before a computer resource starts the booting process, it reads a boot image and verify the e-signature of the boot image, using the public key held in the computer resource. If the verification is successful, the computer resource executes the booting process; if the verification is unsuccessful, the computer resource does not execute the booting process.

A boot image of large size is divided into small parts and discrete e-signatures are attached or otherwise associated with the parts. During the booting process, the e-signature attached (associated) with a part of the boot image is verified when the part is read. In the middle of the booting process, if an unsuccessful verification of the e-signature of a part occurs, the booting process is aborted. However, a total time for verifying the e-signatures of all parts may be still long. Therefore, in another aspect of the present invention, an importance level is assigned to each part. According to the importance level information given with boot instructions, e-signature verification is performed only for parts with a certain importance level and higher.

Moreover, if a same boot image is loaded to a plurality of computer resources to boot the resources, its part for which e-signature verification should be performed is differentiated per computer resource, according to the importance level information, for example, and concurrent signature verification is performed across the computer resources to be booted at the same time.

In the method for setting up hosting environments of the present invention, computer resources are booted with boot images with e-signatures loaded thereto, while verifying the e-signatures, thereby security is preserved and faster hosting environment setup can be performed.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

EMBODIMENT 1

Embodiment 1 of the method for setting up hosting environments according to the present invention will be described in detail hereinafter with reference to FIGS. 1 through 8. Embodiment 1 of the present invention, which will be described hereinafter, is an example of the method in which a computer resource reads a boot image immediately before starting the booting process and verifies the e-signature with the public key held in the computer resource, wherein the boot image is divided into multiple parts, to each of which an e-signature is attached, for the purpose of solving the problem that it takes long to verify the e-signature of a large boot image. During the booting process, each part's e-signature is verified separately and, upon the detection of a part for which the verification is unsuccessful, the booting process is aborted. It is assumed that pairs of asymmetric keys (pairs of public and private keys) are prepared beforehand and the public keys are respectively stored in the BIOS ROMs of computer resources and the private keys are stored on a central management server.

Figure 1:
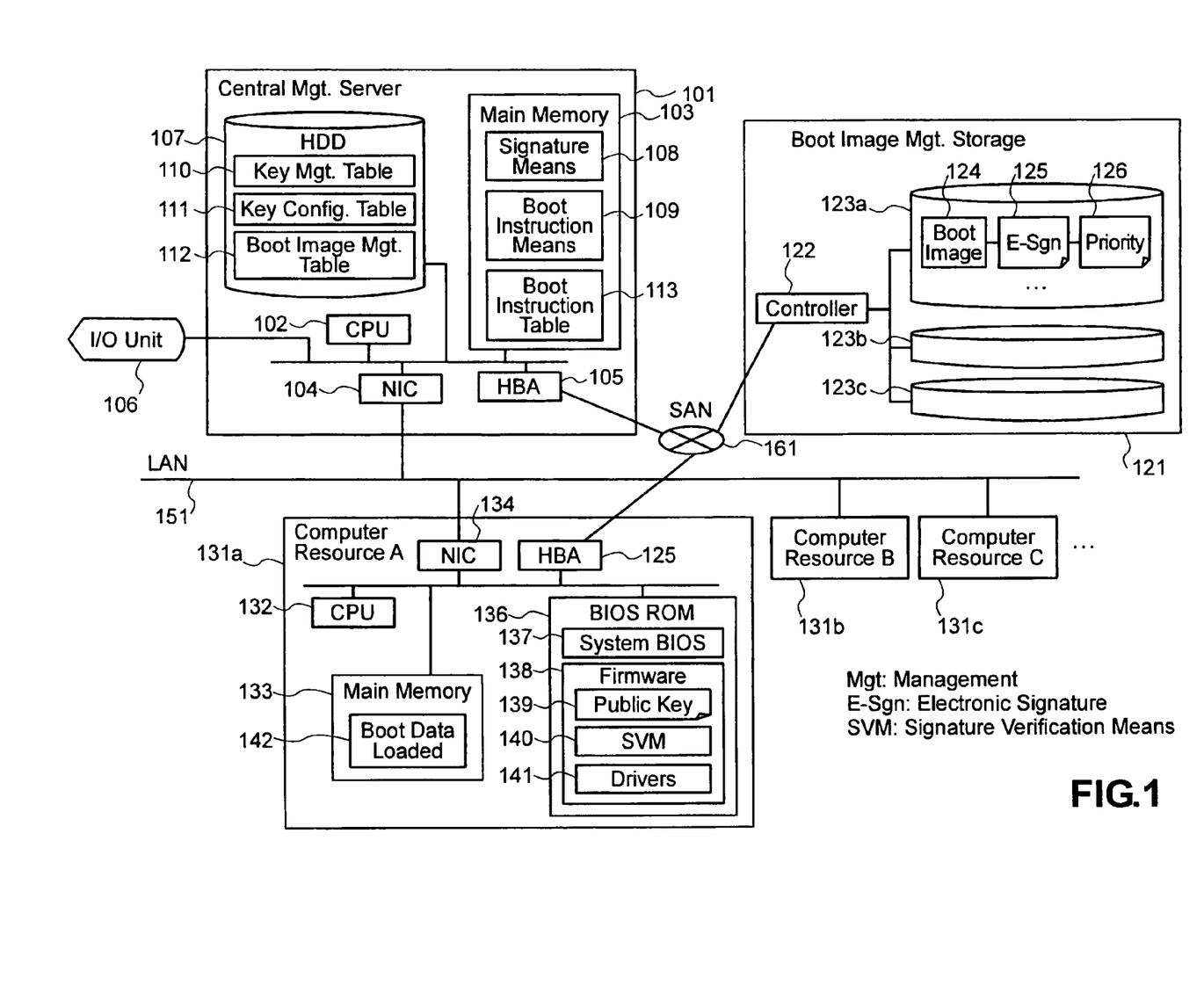
FIG. 1 shows an example of architecture to realize the method for setting up hosting environments, according to Embodiment 1 of the present invention, involving the structure and functional blocks of a central management server, the structure and functional blocks of one of the computer resources which are controlled by the central management server, and the structure and functional blocks of a boot image management storage which stores and manages boot images.

FIG. 1 shows an example of architecture to realize the method for setting up hosting environments in the present invention, involving the structure and functional blocks of the central management server, the structure and functional blocks of one of the computer resources which are controlled by the central management server, and the structure and functional blocks of a boot image management storage which stores and manages boot images.

In FIG. 1, reference numeral 101 denotes the central management server which comprises a CPU 102, a main memory 103, a network interface card (NIC) 104, a host bus adapter (HBA) 105 for the storage 105, an I/O unit 106 comprising a keyboard, monitor, and other devices, and a hard disk drive (HDD) 107. In the main memory 103 of the central management server 101, a signature means 108 for generating an e-signature to a boot image and a boot instruction means 109 which issues an instruction to set up hosting environments with identification of a boot image and at least one computer resource must have been loaded. Action can be specified via the I/O unit 106. In the HDD 107, a key management table 110 containing the public keys and their corresponding private keys, a key configuration table 111 containing mappings between the computer resources and the public keys, and a boot image management table 112 containing boot image parts and their locations, the identifiers of the private keys used to generate the e-signatures to the boot image parts, and priority information for each boot image part in signature verification are retained.

Reference numeral 121 denotes the boot image management storage comprising a controller 121 which exerts I/O control, managing a plurality of HDDs as a single volume, and the HDDs 123 which constitute the storage. Each of the HDDs 123 in the boot image management storage 121 stores a plurality of sets of a boot image (part) 124, its e-signature 125, and its priority information 126 in signature verification.

Reference numeral 131 denotes computer resources, each of which comprises a CPU 132, a main memory 133, an NIC 134, an HBA 125, and a BIOS ROM 136. In the BIOS ROM 136, a system BIOS 137 and firmware 138 are stored. As the firmware, a public key 139, a signature verification means 140, and various drivers 141 (NIC driver, HBA driver, etc.) are stored. After the completion of hosting environment setup operation, boot data 142 read through the booting process performed by the system BIOS 137 is stored into the main memory 133.

Reference numeral 151 denotes a local area network (LAN) which is used for information exchange between the central management server and the computer resources 131. Access between the central management server 101 and the computer resources 131 is performed via the NIC 104 and NIC 134.

Reference numeral 161 denotes a storage area network (SAN) which is used for information exchange between the central management server 101 and the boot image management storage 121 and between the computer resources 131 and the boot image management storage 121. Access between the central management server 101 and the boot image management storage 121 and between the computer resources 131 and the boot image management storage 121 is performed via the HBA 105, HBA 125, and the controller 122.

The present embodiment is arranged such that each computer resource 131 starts the booting process by the instruction from the boot instruction means 109 on the central management server 101 and boots by reading the specified boot image, thereby desired hosting environments can be set up.

Figure 2:
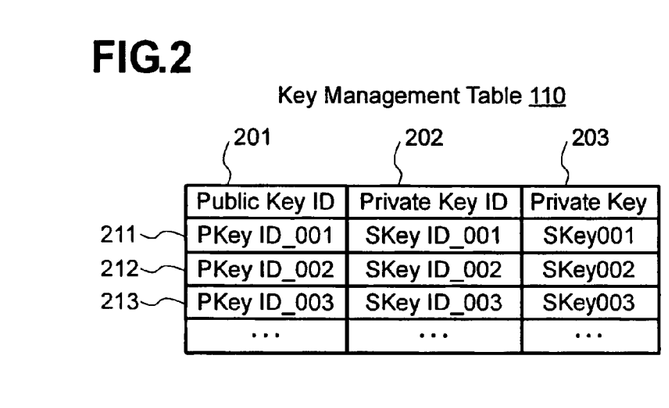
FIG. 2 shows an example of a key management table 110.

FIG. 2 shows an example of the key management table 110. This table is provided to store the public keys respectively stored in the BIOS ROMs 136 of the computer resources 131 and their corresponding private keys and made up of fields (columns): public key ID 201, private key ID 202, and private key 203.

Looking at a record (row) 211 in the table of FIG. 2, the record 211 contains the following information: the private key ID 202 corresponding to the public key with public key ID 201 of "PkeyID_001" is "SKey_001" and the value of the private key 203 is "Skey_001."

Figure 3:
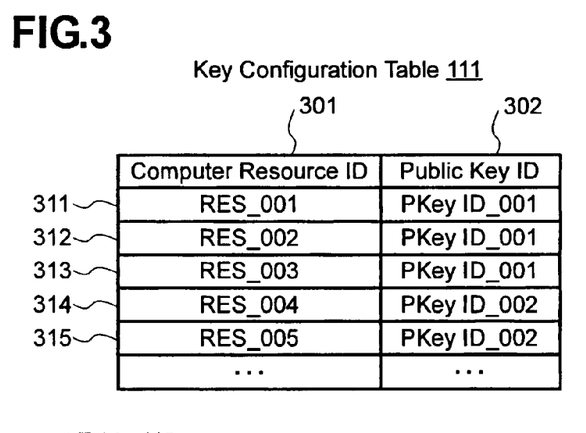
FIG. 3 shows an example of a key configuration table 111.

FIG. 3 shows an example of the key configuration table 111. This table is provided to retain information about a public key 139 and what computer resource 131 in which the public key is stored and made up of fields (columns): computer resource ID 301 and public key ID 302.

Looking at a record (row) 311 in the table of FIG. 3, the record 311 contains the following information: the ID of the public key stored in the BIOS ROM 136 of the computer resource 131 with the computer resource ID 301 of "RES_001" is "PKeyID_001."

Figure 4:
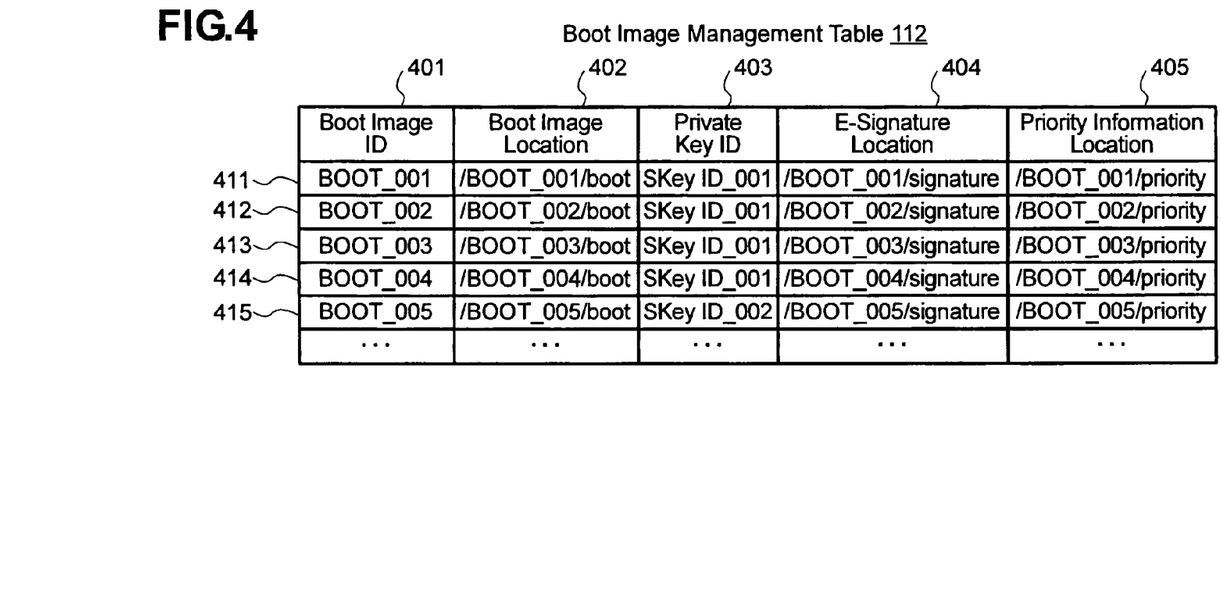
FIG. 4 shows an example of a boot image management table 112.

FIG. 4 is an example of the boot image management table 112. This table is provided to retain the location of a boot image, information about what private key was used to generate an e-signature to the boot image, the location of the e-signature, and priority information per part of the boot in signature verification, and made up of fields (columns): boot image ID 401, boot image location 402, private key ID 403, e-signature location 404, and priority information location 405.

Looking at a record (row) 411 in the table of FIG. 4, the record 411 contains the following information: the boot image with boot image ID 401 of "BOOT_001" is stored in boot image location "/BOOT_001/boot," the e-signature generated by the private key with private key ID 403 of "SKeyID_001" is attached to it, the e-signature is stored in e-signature location "/BOOT_001/signature," and the priority per part of the boot image in signature verification is stored in priority information location "/BOOT_001/priority."

Figure 5:
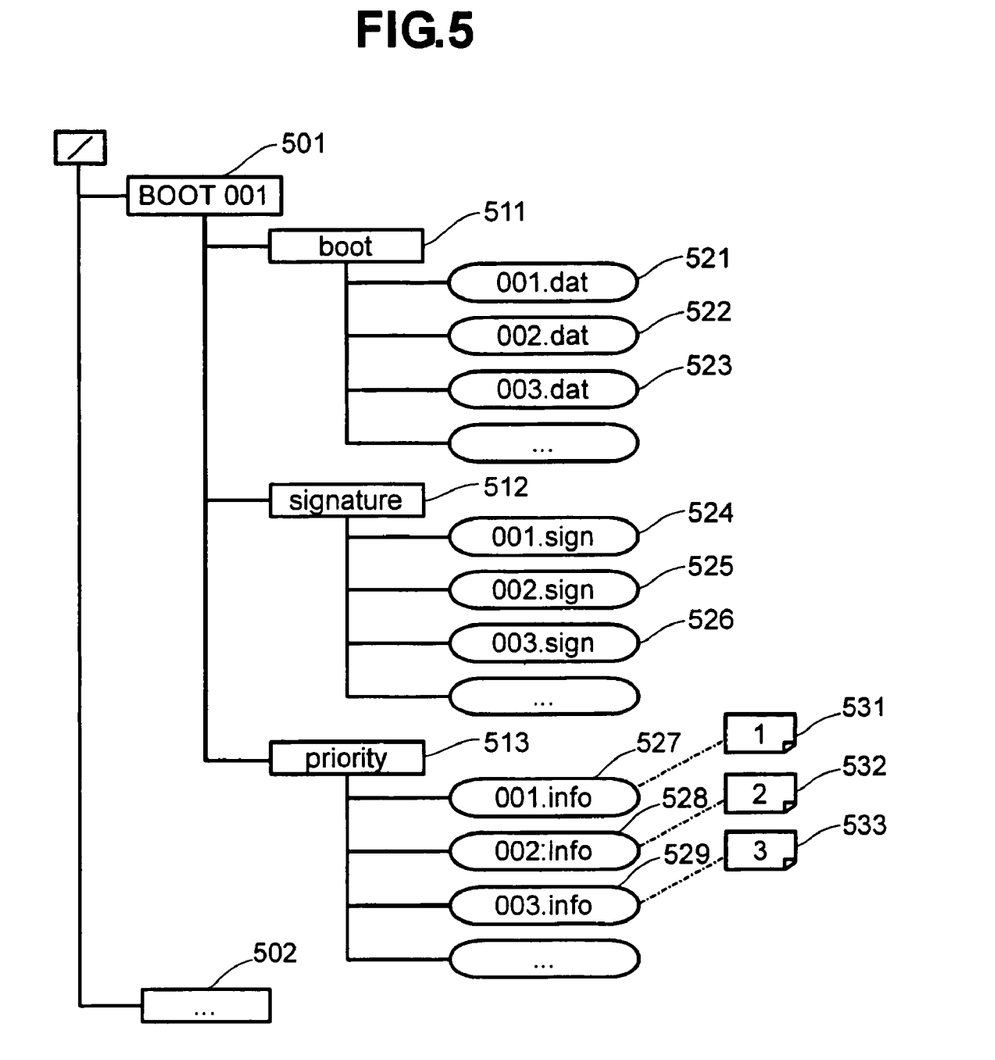
FIG. 5 shows a directory structure example for storing boot images 124, their e-signatures 125, and priority 126 in the boot image management storage.

FIG. 5 shows a directory structure example for storing the boot images 124, their e-signatures 125, and priority 126 in the boot image management storage 121. Under the root directory "/", directories per boot image ID are present. Under one of these directories, a directory for boot images 511, a directory for e-signatures 512, and a directory for priority information 513 are present. In the directories 511 to 513, the files of the boot image parts (521 to 523), the files of the e-signatures to the boot image parts files (524 to 526), and the files that retain the priority of each boot image part file in e-signature verification (527 to 529) are stored respectively. The levels of the priority per part are stored in the priority files (531 to 533).

In the example of FIG. 5, the boot image with ID of "BOOT_001" is divided into boot image files (parts) "001.dat" 521 to "003.dat" 523, the e-signature file to the boot image file "001.dat" 521 is "001.sign" 524, and the priority of the boot image file "001.dat" 521 in e-signature verification is stored in the "001.info" file and its level is "1" 531.

Although the plurality of HDDs 123 exist in the boot image management storage 121, the controller 122 sees them as a single volume.

Figure 6:
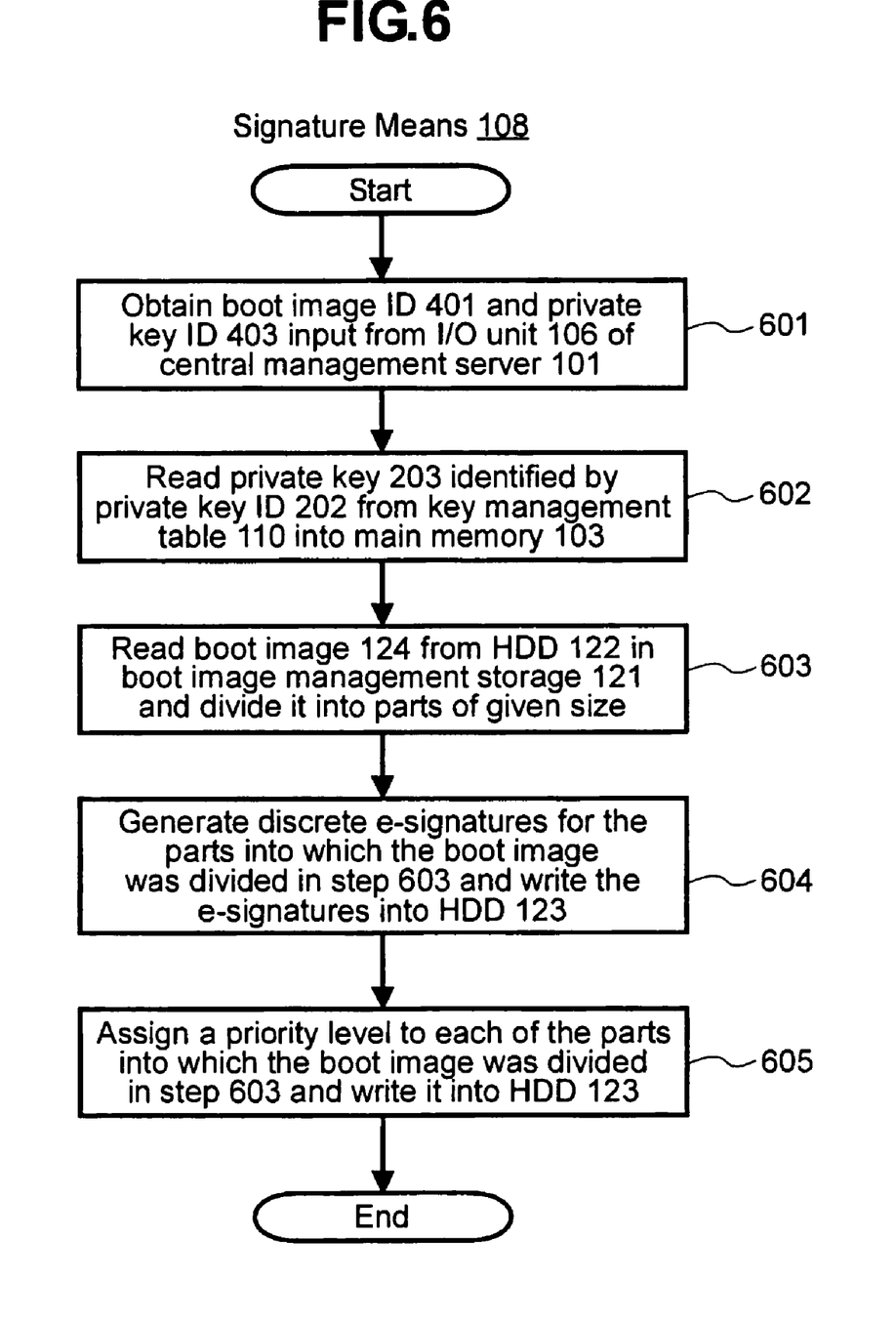
FIG. 6 is a flowchart describing the flow of a process that a signature means 108 carries out in Embodiment 1 of the present invention.

FIG. 6 is a flowchart describing the flow of a process that the signature means 108 carries out. Referring to the flowchart of FIG. 6, the flow of the process comprising dividing a boot image into parts, attaching (or otherwise associating) discrete e-signatures to the parts, and assigning priority to the parts in e-signature verification will be explained below.

First, the signature means 108 obtains a boot image ID 401 and a private key ID 403 input from the I/O unit 106 of the central management server 101 (step 601). Next, referring to the key management table 110, the signature means 108 reads the private key 203 identified by the private key ID 202 into the memory (step 602). Then, the signature means 108 reads the boot image 124 from the appropriate boot image HDD 123 in the boot image management storage 121 and divides it into parts of given size (step 603). Next, the signature means 108 generates discrete e-signatures for the parts into which the boot image was divided in step 603 and stores the parts and their e-signatures into the boot image HDD 123 (step 604). Then, the signature means 108 assigns a priority level to each of the parts into which the boot image was divided in step 603 and stores the priority level into the boot image HDD 123 (step 605). The priority levels of the parts may be specified by a user. Unless specified, levels in a range such as, for example, "1" to "3" may be assigned to the parts equally. In the present embodiment, priority level "1" is defined as the highest priority. It is also possible to set the priority level of a part, based on information about the contents of the part, that is, the type of a file and the frequency of access to the file, the type of a function and the number of times the function has been called, the type of data and the frequency of access to the data, etc. By priority indexing based on such information, the signature of a boot image can be verified faster, while a security level is preserved.

Figure 7:
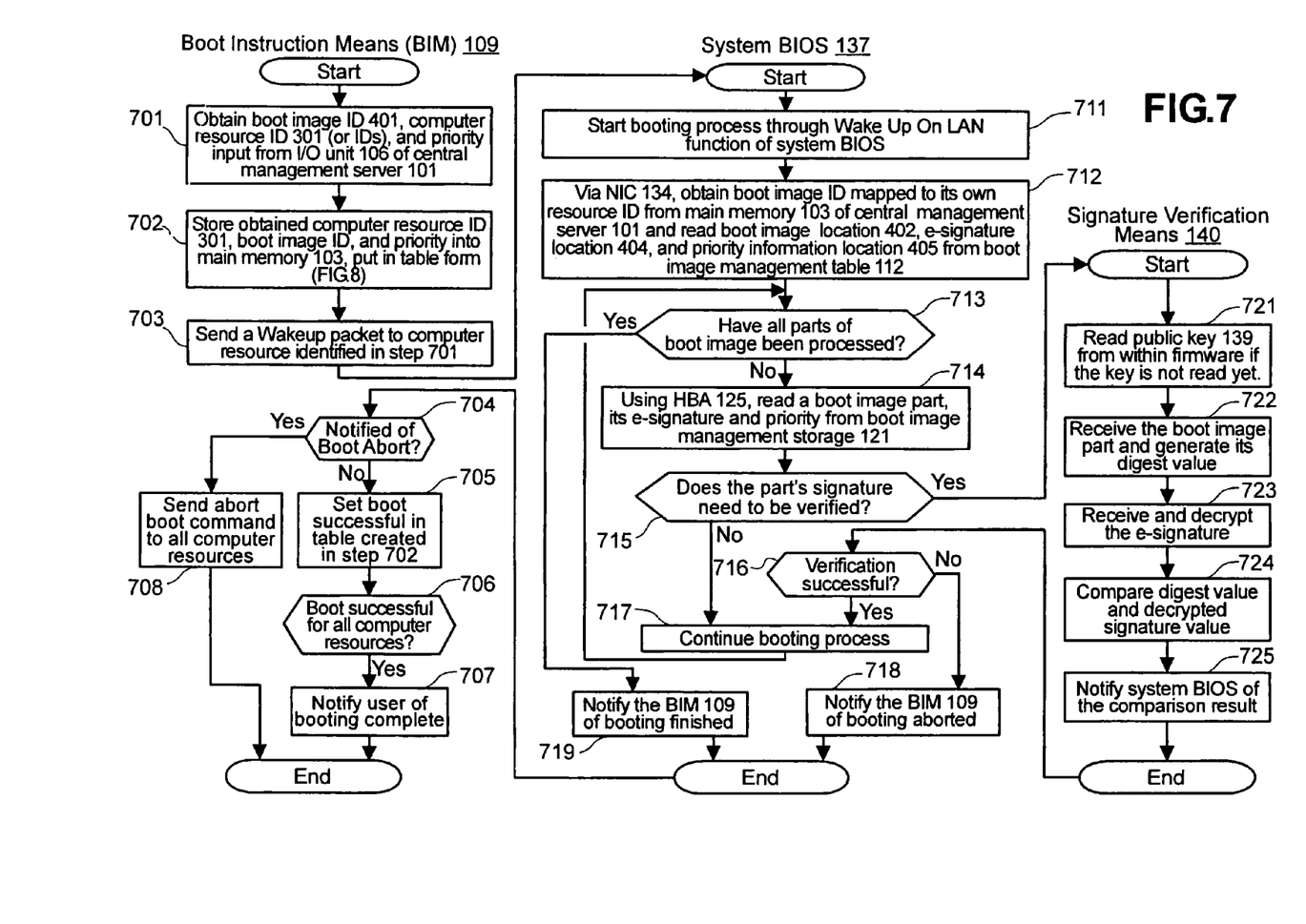
FIG. 7 is a flowchart describing the flow of a process from receiving a boot instruction up to hosting environment setup completion, which is carried out by a boot instruction means 109, a system BIOS 137, and a signature verification means 140 in Embodiment 1 of the present invention.

FIG. 7 is a flowchart describing the flow of a process from receiving a boot instruction up to hosting environment setup completion, which is carried out by the boot instruction means 109, the system BIOS 137, and the signature verification means 140. Referring to the flowchart of FIG. 7, the process will be fully explained below.

First, the boot instruction means 109 obtains a boot image ID 401, a computer resource ID 301, and priority in e-signature verification input from the I/O unit 106 of the central management server 101 (step 701). At this time, if the central management server is requested to boot a plurality of computer resources 131 by loading a same boot image to the resources, the boot instruction means 109 obtains the IDs of the plurality of computer resources.

Figure 8:
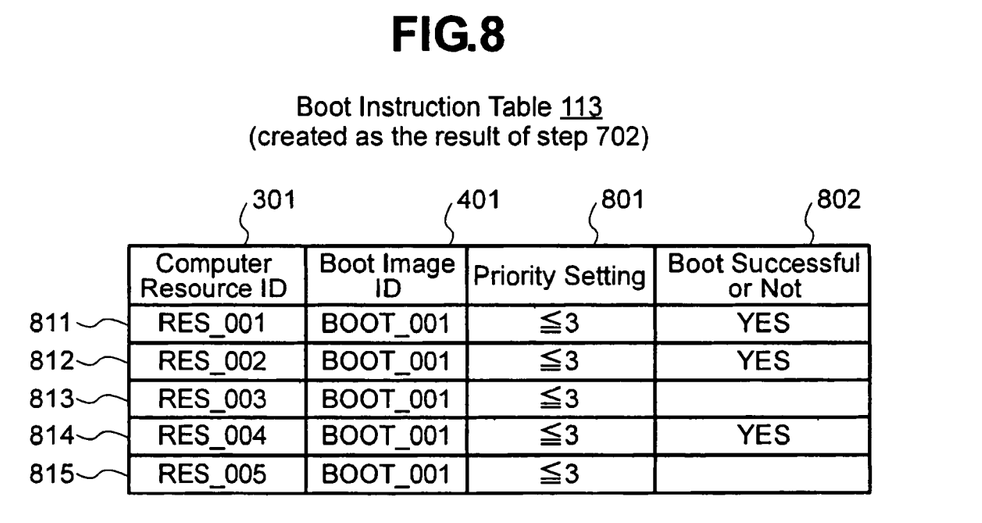
FIG. 8 shows an example of a boot instruction table 113.

Next, the boot instruction means 109 stores the obtained computer resource ID 301, boot image ID 401, and priority into the main memory 103, put in table form (step 702). An example of a boot instruction table 113 created by step 702 is shown in FIG. 8. This table is made up of fields (columns): computer resource ID 301, boot image ID 401, priority setting 801, and boot successful or not 802. The example table of FIG. 8 contains records in an instance of loading the boot image with boot image ID 401 of "BOOT_001" obtained in step 701 to five computer resources of "RES_001" to "RES_005" as entered in the cells of the computer resource ID 301 field to boot the computer resources, wherein the priority setting is "3 or less" for the boot image parts whose signatures must be verified during the booting process. At the point of time of step 702, all the cells in the boot successful or not 802 field must be empty. A value is entered into the boot successful or not 802 field cells in step 705 (which will be detailed later).

Next, the boot instruction means 109 sends Wake Up packets to all computer resources identified by the computer resource IDs 301 specified in step 701 via the NIC 104 (step 703). Each compute resource 131 receives a Wake Up packet sent in step 703 via the NIC 134 and starts the booting process through a Wake Up On LAN function of the system BIOS 137 (step 711). Here, the plurality of computer resources start the booting process concurrently. The Wake Up On LAN function can activate the computer when the computer receives a particular packet and this is a widely used technique.

Next, the system BIOS 137 reads a network driver 141 included in the firmware and, via the NIC 134, obtains the boot image ID mapped to its own computer resource ID from the main memory 103 of the central management server 101 and reads the boot image location 402, e-signature location 404, and priority information location 405 from the boot image management table 112 (step 712). For example, if its own computer resource ID is "RES_001," the system BIOS 137 reads a record 811 in the table of FIG. 8 and obtains "BOOT_001" in the boot image ID 401 field and, moreover, obtains the boot image location "/BOOT_001/boot" associated with "BOOT_001" from the boot image management table 112. Also, the system BIOS 137 obtains the e-signature location 404 and priority information 405 associated with "BOOT_001" from this table.

Then, the system BIOS 137 reads an HBA driver 141, gets access to the boot image management storage 121 via the HBA 125, and reads a boot image part (e.g., 521), its e-signature (e.g., 524), and priority (e.g., 531), if all parts of the boot image have not been processed (a conditional branch 713) (step 714).

Next, the system BIOS 137 compares the priority level read in step 714 with the priority setting in the table (FIG. 8) created in step 702 and determines whether the part's signature needs to be verified (a conditional branch 715). If it is determined that the signature needs to be verified in the conditional branch 715, the process goes to step 721; if not, the process skips e-signature verification and goes to step 717 where the system BIOS 137 continues the booting process.

The signature verification means 140 reads the public key 139 from the firmware (step 721). Then, the signature verification means 140 generates a digest value of the boot image (step 722). Next, the signature verification means 140 decrypts the e-signature 125 with the public key 139 read in step 721 (step 723). The signature verification means 140 compares the digest value generated in step 722 and the signature value decrypted in step 723 (step 724). If both values match, the signature verification means 140 notifies the system BIOS of a match occurring; if the values do not match, it notifies the system BIOS of a mismatch (step 725).

In step 716, the system BIOS 137 receives the notification from the signature verification means 140 in step 725 and determines whether or not the signature verification is successful. If the signature verification is successful, the process goes to step 717 where the system BIOS 137 continues the booting process. If the signature verification is unsuccessful, the process goes to step 718 where the system BIOS 137 notifies the boot instruction means 109 of booting aborted.

Steps 714 to 717 are repeated until it is determined in the conditional branch 713 that all parts of the boot image have been processed. For all parts whose signatures need to be verified, when the signatures have been verified successfully, then the booting process has finished all right. In that case, the system BIOS 137 notifies the boot instruction means 109 of booting finished.

The boot instruction means 109 receives notification of whether or not the boot is successful from the system BIOS. By step 704, if it is notified of boot abort, the boot instruction means 109 sends abort boot commands to all computer resources to be booted, obtained in step 701. In other words, if unsuccessful signature verification occurs on any one of the computer resources to be booted, the booting processes on all the computer resources are aborted.

By step 704, if the boot instruction means 109 is notified of booting finished, it sets the boot successful on that computer resource in the boot successful or not 802 field cell for the computer resource in the table created in step 702 (step 705). The table example of FIG. 8 indicates that the boot has finished on the computer resources in the records 811, 812, 814.

When the boot successful or not 802 field cells for all records in the table created in step 702 have been filled with "YES," then the booting processes on all the computer resources have finished. Thus, the boot instruction means 109 notifies the user of the booting complete via the I/O unit 106.

While, in the above description, the user requests the central management server 101 to execute this process through the I/O unit 106, timer-based process execution control may be performed, if the central management server 101 is provided with a schedule management function.

If priority levels "1" to "3" are assigned the parts of the boot image obtained in step 701, and if the priority setting is "3 or less" for the boot image parts whose signatures must be verified during the booting process, then the signatures of all the above parts are to be verified. If the priority setting is "1 or less" for the boot image parts whose signatures must be verified during the booting process, the signatures of only the parts with priority level "1" are to be verified. If the priority setting is "0 or less" for the boot image parts whose signatures must be verified during the booting process, no parts are subjected to signature verification. In this way, the boot image parts whose signatures must be verified during the booting process may be limited by priority. Thus, the invented method can accommodate the need to shorten the boot time while not to dispense with e-signature verification completely.

While the boot instruction means 109 obtains a boot image ID 401, a computer resource ID 301, and priority in e-signature verification input from the I/O unit 106 of the central management server 101 in step 701, different levels of priority may be specified for a plurality of computer resources 131. For example, priority "3" may be specified for a computer resource ID "RES_001" and priority "1" for a computer resource ID "RES_002." In this case, redundant e-signature verification for a same part on the plurality of computer resources is eliminated. In other words, the e-signature of a part is verified only once on any of the computer resources. Since the booting processes on the computer resources can be executed concurrently, the total boot processing time can be shortened. Tasks of signature verification for the parts can be allocated to the computer resources. For example, if there are a plurality of parts with priority level "1," and if there are a plurality of computer resources capable of executing verification tasks, the tasks can be allocated to the computer resources so that the load of signature verification for the parts is balanced across the resources. Then, signature verification tasks for parts with priority level "2" can be executed in the same manner.

In the present embodiment, the method for reducing the number of boot image parts whose e-signatures must be verified has been described through the steps of dividing a boot image into parts, attaching discrete e-signatures to the parts, assigning a priority level to each part in e-signature verification, and specifying a priority setting in the boot instruction. This copes with a problem that to verify the e-signatures to all boot image parts takes longer than to verify a boot image not divided in consequence of dividing the boot image into parts. According to the method of the present embodiment, for example, if more importance is placed on security robustness, a high priority setting should be specified so that signature verification will be performed for all boot image parts. If more importance is placed on reduction in the boot processing time, a low priority setting should be specified so that signature verification will be skipped for the parts with low priority. There is a tradeoff between security robustness and boot processing time and which has more weight can be controlled by priority setting by user.

Figure 12:
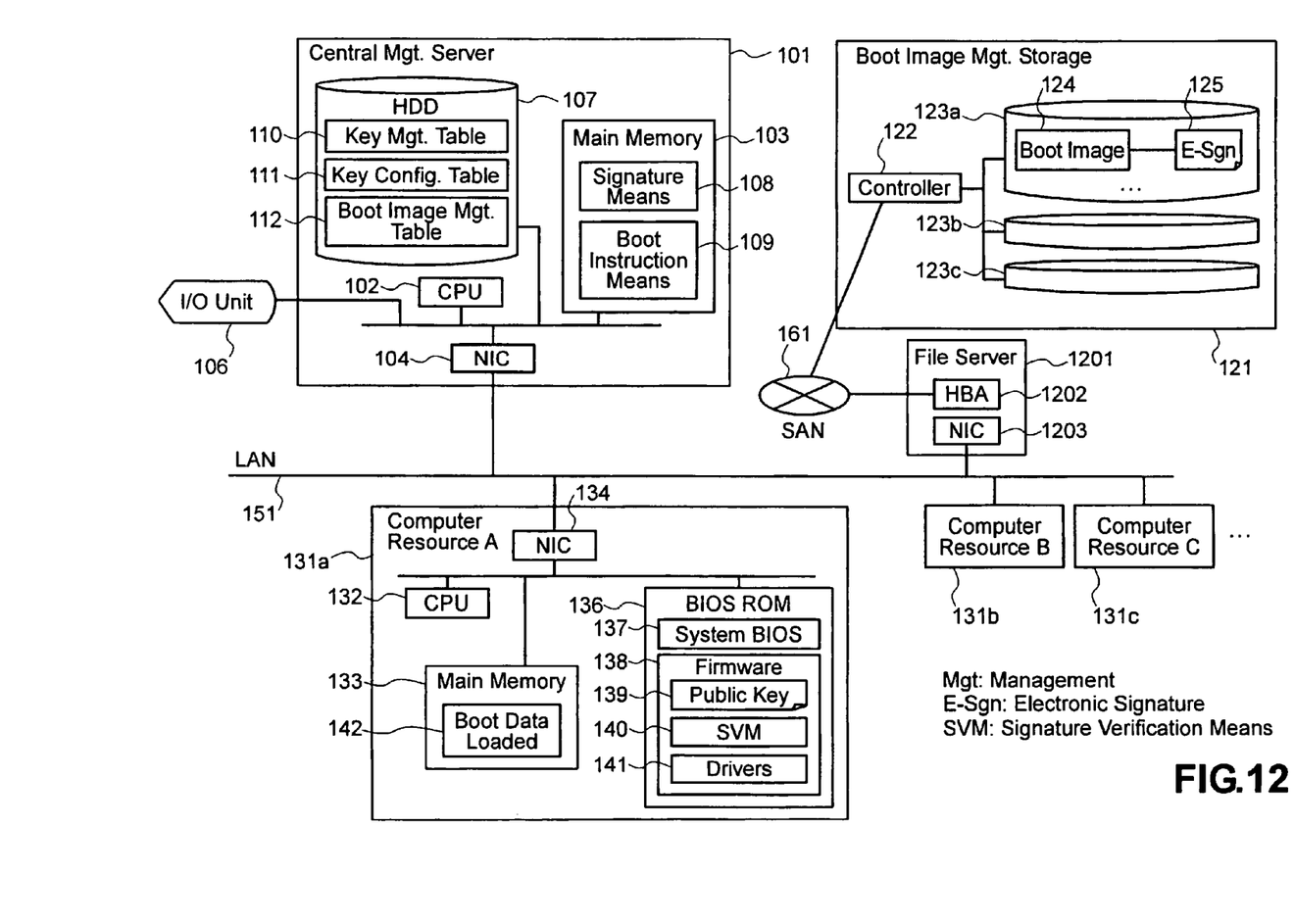
FIG. 12 is an example of architecture comprising functional blocks for carrying out LAN boot in Embodiment 1 and Embodiment 2 of the present invention.

FIG. 12 shows a modified architecture where access between the central management server 101 and the boot image management storage 121 and between the computer resources 131 and the boot image management storage 121 is performed via NICs instead of HBAs, although the access is performed via the HBA 105, HBA 125, and the controller as described above in the present embodiment. In FIG. 12, reference numeral 1201 denotes a file server that is computer equipped with an HBA 1202 and an NIC 1203. In this architecture, access between the central management server 101 and the boot image management storage 121 is performed via the NIC 104, LAN 151, NIC 1203, HBA 1203, SAN 161, and the controller 122. Access between the computer resources 131 and the boot image management storage 121 is performed via the NIC 134, LAN 151, NIC 1203, HBA 1202, SAN 161, and the controller 122.

While, in the present embodiment (FIG. 1), boot images 124, e-signatures 124, and priority information 126 are managed on the management storage and booting each computer resource via the HBA 125 (so-called SAN boot) is performed as described above, it is also possible to boot each computer resource via the NIC 134 (so-called NIC boot) via the file server 1201, as shown in FIG. 12.

EMBODIMENT 2

Embodiment 2 of a dynamic system reconfiguration method according to the present invention will be described in detail, referring to mainly FIGS. 9 through 11. Embodiment 2 of the present invention, which will be described hereinafter, is the method in which an e-signature is dynamically attached to a boot image during the booting process for hosting environment setup.

Figure 9:
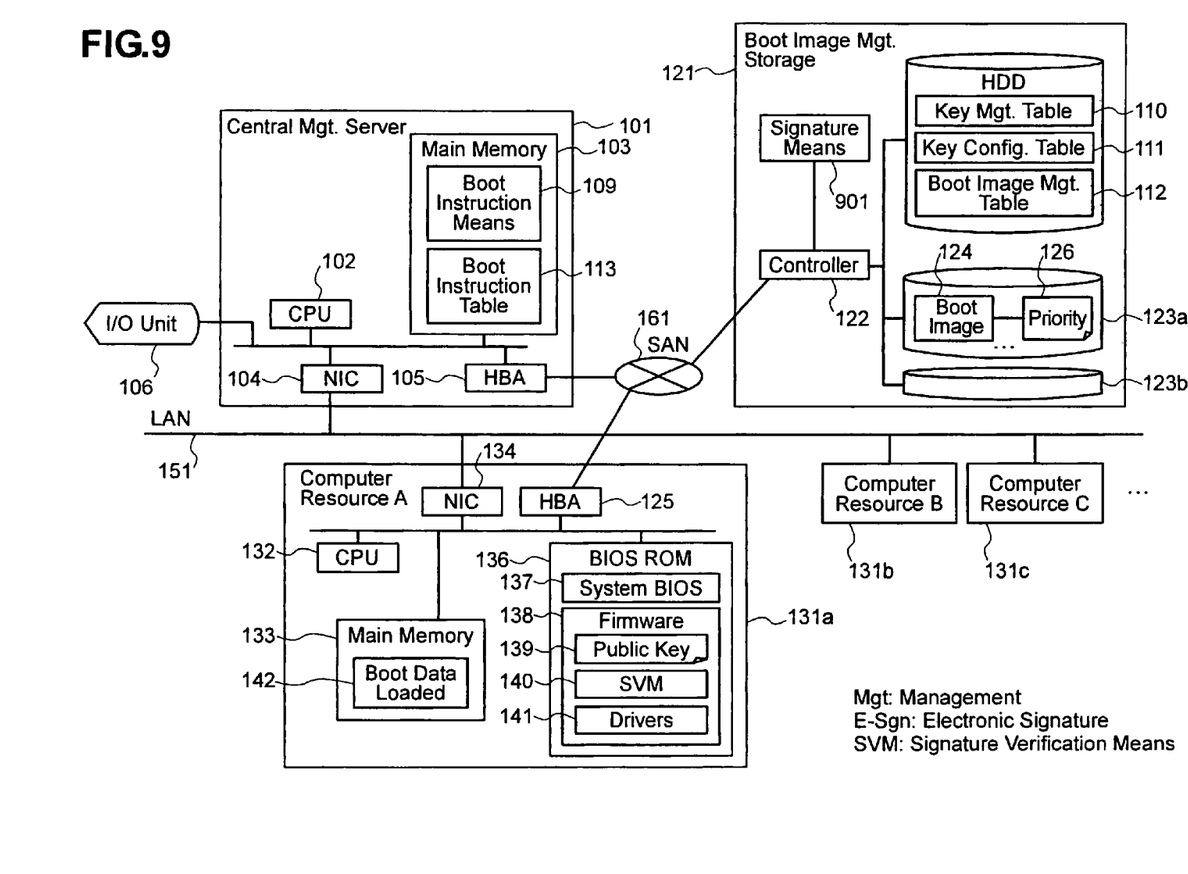
FIG. 9 shows an example of architecture to realize the method for setting up hosting environments, according to Embodiment 2 of the present invention, involving the structure and functional blocks of the central management server, the structure and functional blocks of one of the computer resources which are controlled by the central management server, and the structure and functional blocks of the boot image management storage which stores and manages boot images.

FIG. 9 shows an example of architecture to realize the method for setting up hosting environments according to Embodiment 2, involving the structure and functional blocks of the central management server, the structure and functional blocks of one of the computer resources which are controlled by the central management server, and the structure and functional blocks of the boot image management storage which stores and manages boot images. Difference from FIG. 1 used in describing Embodiment 1 lies in that a signature means 901, key management table 110, key configuration table 111, and boot image management table 112 are provided in the boot image management storage 121 (moved from the central management server 101). The structures of and what data retained in the key management table 110, key configuration table 111, and boot image management table 112 are the same as described in Embodiment 1.

Figure 10:
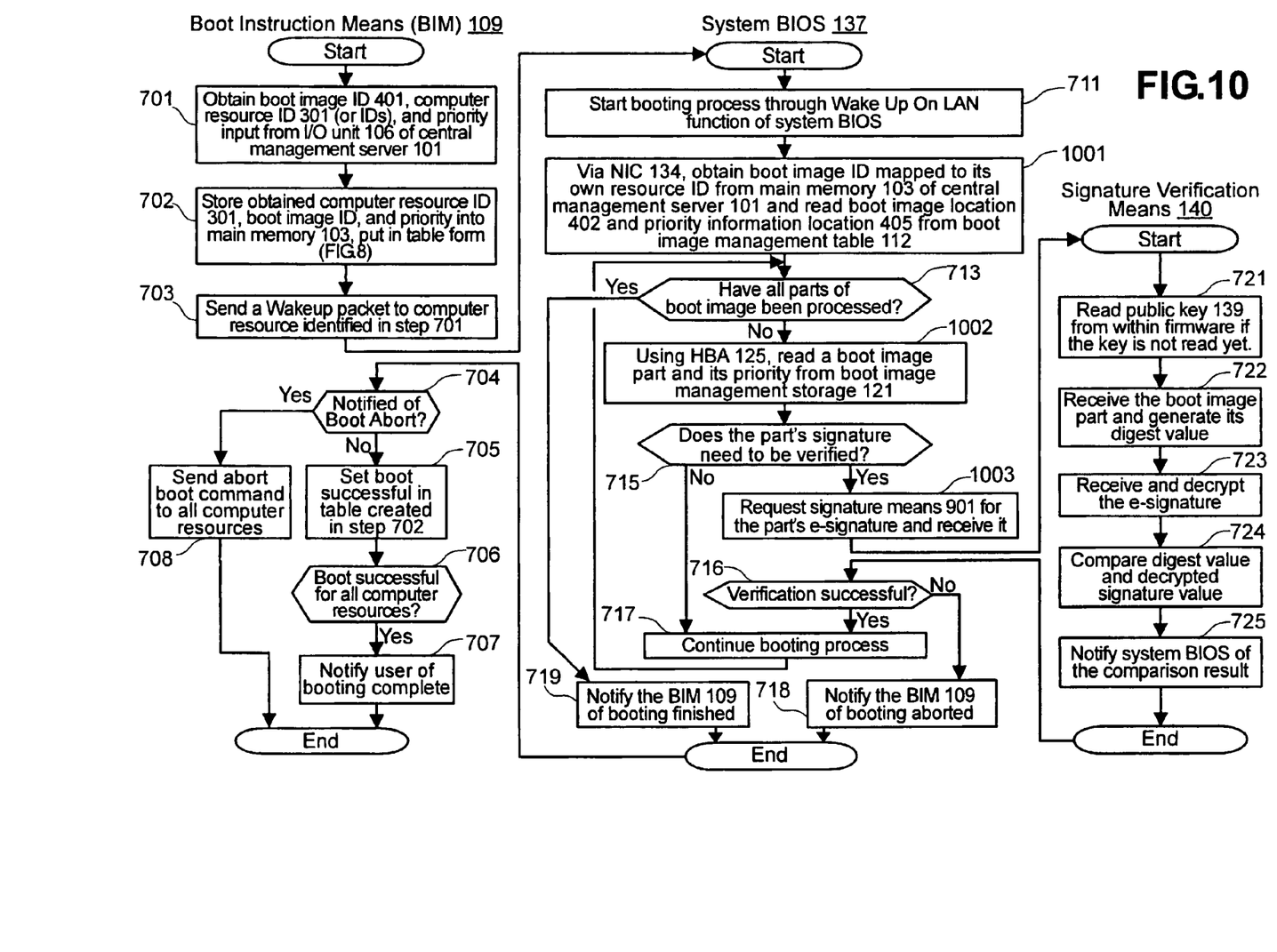
FIG. 10 is a flowchart describing the flow of a process from receiving a boot instruction up to hosting environment setup completion, which is carried out by the boot instruction means 109, the system BIOS 137, and the signature verification means 140 in Embodiment 2 of the present invention.

FIG. 10 is a flowchart describing the flow of a process from receiving a boot instruction up to hosting environment setup completion, which is carried out by the boot instruction means 109, the system BIOS 137, and the signature verification means 140. Difference from FIG. 7 used in describing Embodiment 1 lines in steps 1001, 1002, and 1003.

The location of the e-signature 404 to a boot image part is read in step 712 of FIG. 7 for Embodiment 1, but it is not read in step 1001 in Embodiment 2. The e-signature to a boot image is read in step 714 of FIG. 7 for Embodiment 1, but it is not read in step 1002 in Embodiment 2. This is because the e-signature is not generated at the point of time of step 1001 in Embodiment 2.

In embodiment 2, a step 1003 is added to the process. In this step, the system BIOS requests the signature means 901 to generate the e-signature. That is, only after a boot image part is determined as the one whose signature needs to be verified in step 715, the system BIOS requests the signature means 901 to attach the e-signature to the boot image part. Thus, it is not necessary to attach e-signatures to boot image parts beforehand and security can be ensured at minimum necessary cost.

Figure 11:
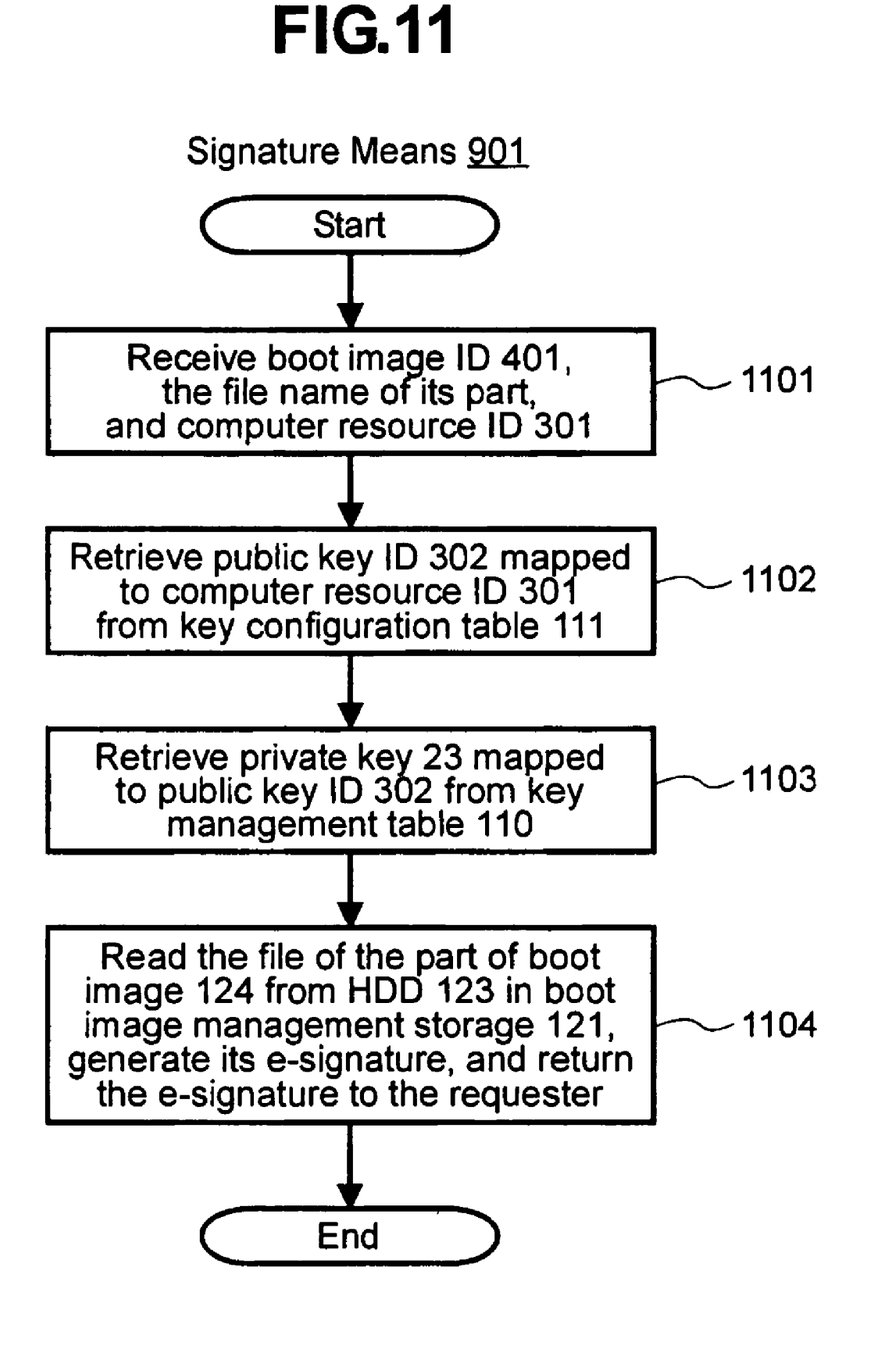
FIG. 11 is a flowchart describing the flow of a process that a signature means 901 carries out in Embodiment 2 of the present invention.

FIG. 11 is a flowchart describing the flow of a process the signature means 901 carries out. Referring to the flowchart of FIG. 11, the flow of the process in which the signature means 901 generates the e-signature to a boot image part and returns it to the requester will be described below.

First, the signature means 901 receives a boot image ID 401, its part file name (any of 521 to 523), and computer resource ID 301 from the requester (step 1101). Then, referring to the key configuration table 111, the signature means 901 retrieves the pubic key ID 302 mapped to the computer resource ID 301 (step 1102). Next, referring to the key management table 110, the signature means 901 retrieves the private key 203 mapped to the public key ID 302 (step 1103). Then, the signature means 901 reads the part file (any identified one of 512 to 523) of the boot image 124 from the appropriate boot image HDD 123 in the boot image management storage 121, generates its e-signature, and returns it to the requester (step 1104).

The present embodiment is an example of the method that dynamically attaches an e-signature to a boot image part when required during hosting environment setup without attaching e-signatures to boot image parts beforehand, though this step of attaching e-signatures is mandatory in Embodiment 1. In Embodiment 1, if computer resources retain different public keys per computer resource, as many e-signatures as the number of the public keys must be attached to boot image files beforehand and stored in the boot image management storage 121. The method of Embodiment 2 can easily accommodate such an instance where computer resources retain different public keys per computer resource.

If access between the central management server 101 and the boot image management storage 121 is to be performed via the NIC 104 and LAN 151, it is preferable to install the file server 1201 as in FIG. 12 for Embodiment 1. Using the file server 1201 enables booting each computer resource via the NIC 134 (so-called NIC boot) as in the alternative architecture for Embodiment 1.

In the architecture of a data center, intra-corporate computing center, and the like, the present invention can be applied to carry out secure and fast hosting environment setup for running a business application system.

What is claimed is:

1. A method for setting up hosting environments among a plurality of computer systems, wherein a boot image is communicated to each of the computer systems over a network connection, the method comprising:
    associating a plurality of digital signatures with a first boot image, the first boot image comprising a plurality of image fragments, each digital signature being generated by applying an encryption key to an associated image fragment;
    receiving information that identifies a plurality of computer systems;
    communicating the first boot image to each of the computer systems over a network, including communicating the image fragments of the first boot image to each computer system along with the digital signatures associated with the image fragments;
    in each computer system, performing a boot sequence including verifying each image fragment by applying a decryption key that is stored in the computer system to the digital signature that is associated with the image fragment, and wherein the verifying includes detecting whether the image fragment as part of the first boot image is valid or invalid; and
    if an invalid image fragment is detected, then communicating an abort signal to abort the boot sequence in each of the computer systems.

2. The method of claim 1 wherein the same image fragments are verified by each of the computer systems.

3. The method of claim 1 further comprising, when an invalid fragment is detected, receiving a first signal at a server computer indicative of the detection of the invalid fragment and communicating a second signal from the server computer to the computer systems in order to abort the boot sequence in each of the computer systems.

4. The method of claim 3 wherein the first signal is communicated to the server computer from the computer system in which the invalid fragment is detected.

5. The method of claim 1 wherein a first signal is communicated to a server computer from a computer system that detects the invalid fragment, the method further comprising the abort signal from the server computer to the other computer systems in order to abort the boot sequence in each of the other computer systems.

6. The method of claim 1 wherein the encryption key and the decryption key in each computer system are a key pair of a public key-private key encryption technique.

7. The method of claim 1 wherein each image fragment is further associated with a priority level, the method further comprising:
receiving a priority level setting; and
communicating the priority level setting to each computer system,
wherein, for each computer system the verifying is selectively performed based on a comparison of the priority level setting with the priority level that is associated with the image fragment, whereby verification of one or more image fragments of the first boot image might not be performed as a result of a comparison of the priority level setting with their associated priority levels.

8. The method of claim 1 further comprising associating a priority level with each image fragment and a priority level setting with each computer system,
wherein verification of an image fragment in a computer system is selectively performed based on a comparison of the priority level setting associated with the computer system with the priority level associated with the image fragment,
wherein the image fragments which are verified in a computer system depend on the priority level setting associated with that computer system, so that a first computer system may verify a set of the image fragments of the first boot image that is different from a set of the image fragments of the first boot image that are verified in a second computer system.

9. The method of claim 8 wherein the priority level setting for each computer system is stored in a server computer, the method including communicating the priority level setting from the server computer to the associated computer system.

10. The method of claim 9 further comprising receiving priority information at the server computer, the priority level settings being based on the priority information.

11. A method for setting up hosting environments among a plurality of computer systems, wherein a boot image is communicated to some of the computer systems over a network connection, the method comprising:
receiving information that identifies a plurality of first computer systems, the first computer systems each being associated with a first boot image;
subsequent to receiving the information that identifies the first computer systems, associating a plurality of digital signatures with the first boot image, including generating a plurality of image fragments that collectively constitute the first boot image, and for each image fragment generating a digital signature to be associated with the image fragment by applying an encryption key to the image fragment; and
communicating the image fragments of the first boot image to each first computer system along with the digital signatures associated with the image fragments,
wherein each first computer system performs a boot sequence including verifying each image fragment by applying a decryption key that is stored in the first computer system to the digital signature that is associated with the image fragment,
wherein the verifying includes detecting whether the image fragment as part of the first boot image is valid or invalid,
wherein if an invalid image fragment is detected, then communicating an abort signal to the first computer systems to abort the boot sequence in the first computer systems.

12. The method of claim 11 wherein the same image fragments are verified by each of the first computer systems.

13. The method of claim 11 further comprising, when an invalid fragment is detected, receiving a first signal at a server computer indicative of the detection of the invalid fragment and communicating a second signal from the server computer to the first computer systems in order to abort the boot sequence in those computer systems.

14. The method of claim 11 wherein if the invalid fragment in detected in one of the first computer systems, then communicating the first signal to the server computer from that first computer system.

15. The method of claim 11 wherein the encryption key and the decryption key in the first computer systems each is a key pair based on a public key-private key encryption technique.

16. The method of claim 11 wherein each image fragment is further associated with a priority level, the method further comprising:
receiving priority level settings; and
associating each computer system with one of the priority level settings,
wherein, for each computer system the verifying is selectively performed based on a comparison of the priority level setting associated with the computer system with the priority level that is associated with the image fragment,
wherein verification of one or more image fragments of the first boot image might not be performed as a result of a comparison of the priority level setting with their associated priority levels.

17. The method of claim 16 wherein the priority level settings are received in a server computer, the method further comprising communicating the priority level settings from the server computer to their associated computer systems.

18. A system for setting up a hosting environment in a plurality of computer systems comprising:
means for processing a boot image to produce a set of image fragments which constitute the boot image, each image fragment being associated with a priority level, wherein a set of image fragments can be produced for each boot image in a plurality of boot images;
means for generating a digital signature for an image fragment using an encryption key, wherein each image in a set of image fragments for a boot image is associated with a digital signature, wherein each set of image fragments is associated with an encryption key used to generate its associated digital signatures;
means for specifying a selected boot image from among plurality of boot images to be communicated to one or more computer systems, the set of image fragments of the selected boot image being communicated to the one or more computer systems;

means for storing encryption keys along with corresponding decryption keys;

means for storing location information in a boot management storage relating to the image fragments of the plurality of boot images, digital signatures, and priority levels, wherein each computer system in the plurality of computer systems includes means for storing a decryption key and verification means for verifying image fragments by applying its decryption key to digital signatures associated with the set of image fragments of a boot image, and wherein a first signal is communicated to a server computer from a computer system that detects an invalid fragment and communicating an abort signal, from the server computer to each computer system in the plurality of computer systems, in order to abort a boot sequence in each of the computer system.

19. The system of claim 18 further comprising means for associating a priority level with each image fragment and a priority level setting with each computer system, wherein verification of an image fragment in a computer system is selectively performed based on a comparison of the priority level setting associated with the computer system with the priority level associated with the image fragment, wherein the image fragments which are verified in a computer system depend on the priority level setting associated with that computer system, so that a first computer system may verify a set of the image fragments of the first boot image that is different from a set of the image fragments of the first boot image that are verified in a second computer system.

20. The system of claim 18 wherein each image fragment is further associated with a priority level, the system further comprising:

means for receiving a priority level setting; and means for communicating the priority level setting to each computer system, wherein, for each computer system the verifying is selectively performed based on a comparison of the priority level setting with the priority level that is associated with the image fragment, whereby verification of one or more image fragments of the first boot image might not be performed as a result of a comparison of the priority level setting with their associated priority levels.

* * * * *